(12) United States Patent
Desreumaux et al.

(10) Patent No.: US 12,271,797 B2
(45) Date of Patent: Apr. 8, 2025

(54) FEATURE SELECTION FOR MODEL TRAINING

(71) Applicant: BUSINESS OBJECTS SOFTWARE LTD., Dublin (IE)

(72) Inventors: Louis Desreumaux, Levallois-Perret (FR); Jacques Doan Huu, Montigny le Bretonneux (FR)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 1008 days.

(21) Appl. No.: 17/313,460

(22) Filed: May 6, 2021

(65) Prior Publication Data

US 2022/0366315 A1 Nov. 17, 2022

(51) Int. Cl.
*G06N 20/20* (2019.01)
*G06N 5/01* (2023.01)

(52) U.S. Cl.
CPC ............... *G06N 20/20* (2019.01); *G06N 5/01* (2023.01)

(58) Field of Classification Search
None
See application file for complete search history.

(56) References Cited

U.S. PATENT DOCUMENTS

| | | | | |
|---|---|---|---|---|
| 2018/0174060 A1* | 6/2018 | Velez-Rojas | ............ | G06N 5/02 |
| 2019/0057284 A1* | 2/2019 | Docherty | ............ | G06F 18/2148 |
| 2019/0220704 A1* | 7/2019 | Schulz-Trieglaff | .... | G16B 40/20 |
| 2019/0362242 A1* | 11/2019 | Pillai | ........................ | G06N 5/01 |
| 2021/0105613 A1* | 4/2021 | San Miguel | .......... | H04W 12/63 |
| 2021/0374562 A1* | 12/2021 | Chang | .................... | G06N 20/00 |

OTHER PUBLICATIONS

Lundberg, Scott M. et al., "Consistent feature attribution for tree ensembles", arXiv:1706.06060v6 [cs.AI], Feb. 17, 2018, 7pgs.
Sigrist, Fabio "Gradient and Newton Boosting for Classification and Regression", arXiv:1808.03064v7 [stat.ML], Oct. 20, 20-21, 2020, (pp. 1-44, 44 total pages).

* cited by examiner

*Primary Examiner* — Xuyang Xia
(74) *Attorney, Agent, or Firm* — Buckley, Maschoff & Talwalkar LLC

(57) ABSTRACT

Systems and methods include determination of a first plurality of sets of data, each including values associated with respective ones of a first plurality of features, partial training of a first machine-learning model based on the first plurality of sets of data, determination of one or more of the first plurality of features to remove based on the partially-trained first machine-learning model, removal of the one or more of the first plurality of features to generate a second plurality of sets of data, partial training of a second machine-learning model based on the second plurality of sets of data, determination that a performance of the partially-trained second machine-learning model is less than a threshold, addition, in response to the determination, of the one or more of the first plurality of features to the second plurality of sets of data, and training of the partially-trained first machine-learning model based on the first plurality of sets of data.

20 Claims, 9 Drawing Sheets

|  | Feature 0 | Feature 1 | Feature 2 | Feature 3 | Feature 4 |
|---|---|---|---|---|---|
|  | 11 |  |  | 14 | 15 |
|  |  | 22 |  |  |  |
|  | 31 |  | 33 |  | 35 |
|  |  | 42 |  | 44 |  |

| Column | Value |
|---|---|
| 0 | 11 |
| 3 | 14 |
| 4 | 15 |
| 1 | 22 |
| 0 | 31 |
| 2 | 33 |
| 4 | 35 |
| 1 | 42 |
| 3 | 44 |

*400*

| RowIdx |
|---|
| 0 |
| 3 |
| 4 |
| 7 |
| 9 |

| Feature 0_con | Feature 1_con | Feature 2_con | Feature 3_con | Feature 4_con |
|---|---|---|---|---|
| .2150 | .8546 | .544 | .6984 | .178 |
| .9657 | .2871 | .9451 | .748 | .5241 |
| .658 | .2954 | .4158 | .1542 | .6874 |
| .1975 | .3265 | .3759 | .0618 | .2944 |

| Feature0 _con_agg | Feature1 _con_agg | Feature2 _con_agg | Feature3 _con_agg | Feature4 _con_agg |
|---|---|---|---|---|
| 2.036 | 1.763 | 2.281 | 1.662 | 1.684 |

| Column 0 | Column 1 | Column 2 | Column 3 | Column 4 |
|---|---|---|---|---|
| 10 |  | 5 | 1 |  |
|  | 8 |  |  | 9 |
|  |  |  |  |  |
| 7 |  |  | 3 |  |

*FIG. 9*

| Indexed Values |
|---|
| (0,10) |
| (2,5) |
| (3,1) |
| (1,8) |
| (4,9) |
| (0,7) |
| (3,3) |

| RowIdx |
|---|
| 0 |
| 3 |
| 5 |
| 5 |
| 7 |

*FIG. 10*

| RowIdx | Non-null Value Columnar Bitmask 1 |
|---|---|
| 0 | 00001101 |
| 3 | 00010010 |
| 5 | 00000000 |
| 5 | 00001001 |
| 7 | |

*FIG. 11*

| Indexed Values |
|---|
| (0,10) |
| ~~(2,5)~~ |
| ~~(3,1)~~ |
| (1,8) |
| (4,9) |
| (0,7) |
| ~~(3,3)~~ |

| RowIdx | Non-null Value Columnar Bitmask 1 |
|---|---|
| 0 | 00001101 |
| 1 | 00010010 |
| 3 | 00000000 |
| 3 | 00001001 |
| 4 | |

*FIG. 12*

FEATURE SELECTION FOR MODEL TRAINING

BACKGROUND

Supervised learning is a branch of machine learning in which a model is trained based on sets of training data, each of which is associated with a target output. More specifically, supervised learning algorithms iteratively train a model to map each set of training data to its associated target output within a suitable margin of error. The trained model can then be used to predict an output based on a set of input data.

Each set of training data (e.g., a database row) includes values of many features (e.g., database columns). The trained model therefore takes each feature into account, to varying degrees. Training data which includes a large number of features may result in a large trained model. A large trained model may be overfit to the training data, sensitive to noise and spurious relationships between the features and the output, slow to load and apply, slow to train, and difficult to interpret. Moreover, the predictive performance of a large trained model might not be appreciably better than that of a different model trained on fewer features of the training set.

Existing techniques attempt to limit the features of a training set which are used to train a model, in the interest of generating a smaller trained model with suitable predictive performance. However, the processing requirements of such techniques can outweigh the resource savings of the resulting trained model. Systems are desired to efficiently identify desired training set features and generate a sparse, accurate, and interpretable model based thereon.

BRIEF DESCRIPTION OF THE DRAWINGS

FIG. 3 is a tabular representation of sparse training data according to some embodiments.

FIG. 4 is a representation of the FIG. 3 data in Compressed Sparse Row (CSR) format.

FIG. 9 is a tabular representation of sparse training data according to some embodiments.

FIG. 10 is a representation of the FIG. 9 data in CSR format.

FIG. 11 is a tabular representation of a bit-wise extended RowIndex table according to some embodiments.

FIG. 12 illustrates removal of feature values in CSR format according to some embodiments.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments relate to feature selection for iteratively-trained models. Embodiments may operate to efficiently identify a subset set of features and train a model based on such features without significantly degrading performance.

According to some embodiments, a model is iteratively trained based on a set of training data until a predetermined number of iterations have been performed. The predetermined number of iterations may be less than would be typically required to train the model to sufficient performance. Using known techniques (e.g., computation of SHapley Additive Explanation (SHAP) values), features of the training data which contribute the least to the predictions of the trained model are determined. These features are removed from the training set and a new model is trained as described above using only the remaining features of the training data.

This process continues until either a newly-trained model exhibits unsatisfactory performance, no low-contributory features are determined, or a maximum number of these iterations have been executed. In the first case, training of the immediately-prior trained model resumes and continues until satisfactory performance is achieved. In the latter two cases, training of the existing model continues until satisfactory performance is achieved.

In some embodiments, the data of the training set is stored in a structure compatible with large and sparse data sets. Upon initiating training of a new model based on a reduced feature set as described above, the thusly-stored data may be manipulated as described below to include only the new feature set, without requiring re-building of the data structure from scratch.

Figure 1:
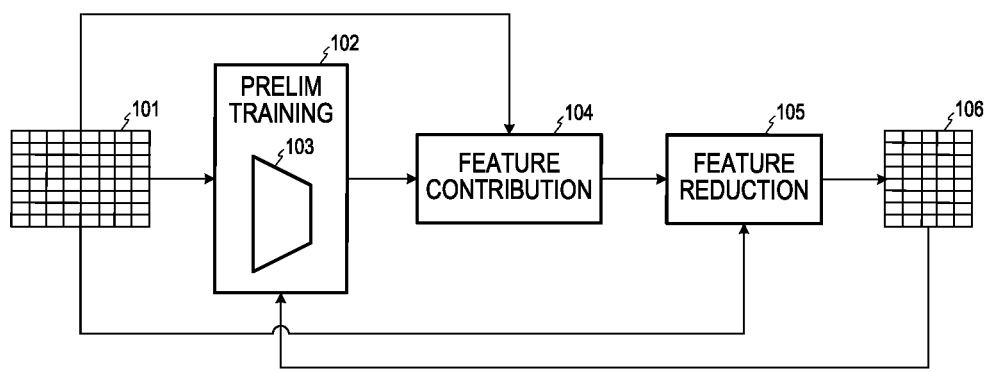
FIG. 1 is a block diagram of an architecture to determine features for model training according to some embodiments.

FIG. 1 is a block diagram of an architecture to determine features for model training according to some embodiments. The illustrated components may be implemented using any suitable combination of computing hardware and/or software that is or becomes known. In some embodiments, two or more components are implemented by a single computing device. Two or more components of FIG. 1 may be co-located. One or more components may be implemented as a cloud service (e.g., Software-as-a-Service, Platform-as-a-Service). A cloud-based implementation of any components of FIG. 1 may apportion computing resources elastically according to demand, need, price, and/or any other metric.

Training data 101 may comprise database table values. More specifically, training data may comprise rows of a database table, with each row including a value of a corresponding database column, or feature. In a database table comprising many features, many of such values may be NULL values. In some embodiments, training data 101 may comprise a random sampling of rows from a much larger set of training data. The values of training data 101 may be formatted into any suitable format, such as but not limited to CSR format as will be described below.

Training data 101 is input to preliminary training component 102 for the purpose of training model 103 as described below. Model 103 may comprise any type of iterative learning-compatible network, algorithm, decision tree, etc., that is or becomes known. Model 103 may be designed to perform any desired predictive task, including but not limited to binary classification (i.e., prediction of a category from a set of two known categories), multiclass classification (i.e., prediction of a category from a set of more than two known categories) and regression (i.e., prediction of a number).

Model 103 may comprise a network of neurons which receive input, change internal state according to that input, and produce output depending on the input and internal state. The output of certain neurons is connected to the input of other neurons to form a directed and weighted graph. The weights as well as the functions that compute the internal states are iteratively modified during training using supervised learning algorithms as is known.

In the case of a decision tree, model 103 is represented as a tree graph which is traversed from top to bottom based on a given data point (e.g., table row) including multiple features. During this traversal, a feature of the data point is compared against a threshold at each intermediate node of the graph. Traversal proceeds either to the left or right child node depending on the result of the comparison. Each intermediate node therefore represents a split on a dataset. The more splits, the more groups into which the dataset is divided. The traversal is complete when one of the leaf nodes is reached. Each leaf is associated with a leaf weight specifying a prediction for all data points that reach that leaf node.

Formally, a decision tree is expressed as a piecewise function whose sub-domains are defined by the instance groups. If q (x) denotes the instance group to which the data point x maps, and $w_{q(x)}$ represents the real value prediction produced by the leaf node, a decision tree is expressed as follows:

$$f(x) = w_{q(x)}$$

Component 102 may comprise any suitable algorithms and hardware for training model 103 based on training data 101. Generally, training of model 103 comprises inputting data 101 into model 103, retrieving resulting predicted values output by model 103, comparing the output predicted values to known ground truth data, modifying model 103 based on the comparison, and continuing in this manner until the difference between the output predicted values and the known ground truth data (i.e., the network loss) is satisfactory.

Stochastic Gradient Tree Boosting (SGTB) is a popular machine learning algorithm due to its simplicity and predictive performance. SGTB produces an ensemble model of decision trees. The model is an "ensemble" in the sense that it synthesizes multiple decision trees to achieve greater predictive power than otherwise. Each data point is fed simultaneously into each decision tree, and the outputs of the decision trees are combined to produce a single prediction. Formally, the predicted label ŷ is given by the sum over K piecewise functions, each corresponding to a tree, as follows:

$$\hat{y} = \sum_{k=1}^{K} f_k(x) = \sum_{k=1}^{K} w_{qk}(x)$$

SGTB trains a tree ensemble in an additive manner, seeking to find the optimal tree $f_t$ that, when added on top of existing (t−1) trees, minimizes a global objective function. SGTB guarantees that each additional tree will necessarily reduce the objective value for the training data. When splitting an instance group into two groups during the induction of decision trees, a data point which is missing a value for a feature evaluated by an intermediate node can proceed to a left or a right child node. SGTB evaluates both possibilities and chooses the one that leads to the greatest reduction of the objective function. SGTB may therefore be suited to sparse training data.

The number of trees (i.e., number of boosting iterations) should be tuned to build a model that generalizes well on new data. This tuning may be performed by monitoring the model's performance on a validation dataset, so as to stop the training as soon as adding new trees does not reduce the objective function for the validation data.

According to some embodiments, the number of training iterations (boosting iterations in the case of SGTB) performed by preliminary training component 102 is limited to a predefined number. If the performance of model 103 has not reached a predefined performance threshold after execution of the predefined number of training iterations, training ceases and model 103 is no longer modified.

Feature contribution component 104 analyses thusly-trained model 103. Feature contribution component 104 may input all or a sample of training data 101 to trained model 103, acquire the corresponding output predicted values, and, for each feature of training data 101, determine an importance value indicating a contribution of that feature to the predictive behavior of trained model 103.

Many current methods for interpreting model predictions characterize the output of a model as a sum of importance values attributed to each input feature. Such an interpretive method is particularly useful if the sum of the importance values for a data point is equal to the output predicted value for that data point, if features that are missing from a data point are attributed an importance value of zero, and if changing a model to rely more on a given feature will not decrease the importance value assigned to that feature.

Importance values determined based on the SHAP method (i.e., SHAP values) are known to exhibit the above characteristics. In the context of predictive modeling, SHAP values reflect the contribution of each feature to a prediction. The average SHAP value of a given feature across all data points estimates the contribution of the given feature to overall model predictions.

Feature reduction component 105 determines low-importance features based on the output of feature contribution component 104. In some embodiments, feature reduction component 105 sorts each feature of training data 101 according to importance value, and identifies N features having the lowest importance values as the low-importance features. Some embodiments include identification of features having importance values below a particular threshold.

Feature reduction component 105 may also remove the determined low-importance features from training data 101, resulting in new training data 106. Conceptually, removal of a feature from training data 101 includes removing a corresponding column (and all values of that column) from training data 101. As will be described below, some embodiments utilize an algorithm to efficiently remove data associated with low-importance features from data 101.

As described above, a new model 103 is then trained by preliminary training component 102 based on new reduced-feature training data 106. The foregoing process repeats until the performance of a newly-trained model has degraded unsuitably from performance of the first-trained model. At this point, a most-recently trained model is retrieved and training thereof continues until a satisfactory performance metric is achieved.

Figure 2:
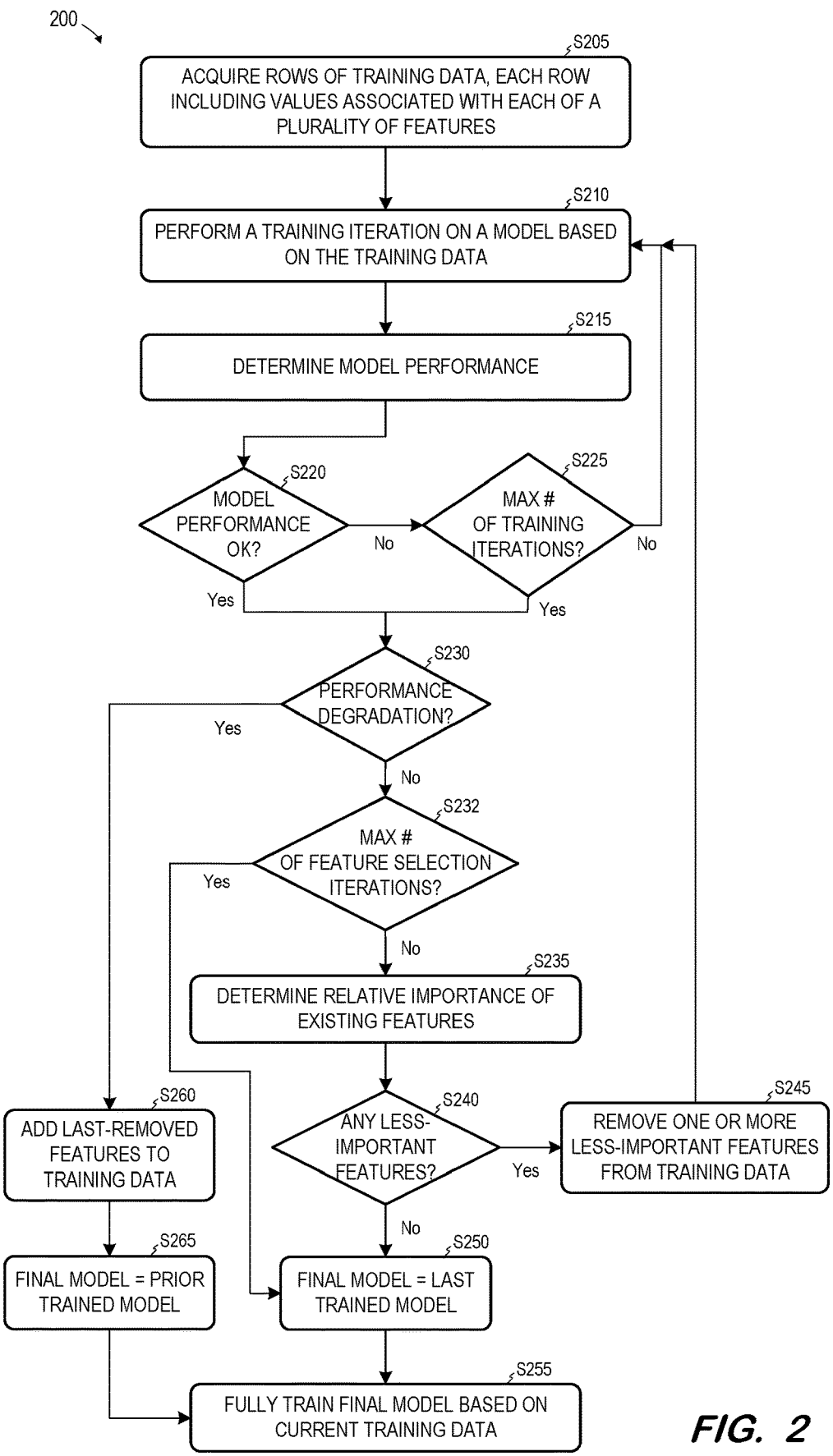
FIG. 2 comprise a flow diagram of a process to determine features and train a model based thereon according to some embodiments.

FIG. 2 is a flow diagram of process 200 to train a classification model and an enhanced predictive model according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any one or more processing units, including but not limited to a microprocessor, a microprocessor core, and a microprocessor thread. Embodiments are not limited to the examples described below.

Process 200 may be initiated by any request to generate a model to perform a task based on a set of training data associated with ground truth values. In one non-exhaustive example, an order fulfillment application may request a model to predict product delivery times, where the model is to be trained based on actual product delivery times (i.e., ground truth data) contained in a database table which stores data associated with historical product orders.

Initially, rows of training data are acquired at S205, where each row includes values respectively associated with one of a plurality of features. Using the above example, each row may be associated with a product order and each row may include values for the features OrderDate, StorageLocation, DeliveryAddress, Weight, etc. FIG. 3 is a tabular representation of rows of training data 300 acquired at S205 according to some embodiments. As shown, a significant percentage of feature values are missing from training data 300 (i.e., training data 300 is sparse).

In some embodiments, the values of the rows are stored in CSR format at S205. FIG. 4 illustrates data structures of CSR format according to some embodiments. Column-value pairs 400 include a row (i.e., a pair) for each non-NULL value present in training data 300. The pair corresponding to a given non-NULL value indicates the column in which the value resides and the value itself. RowIndex 410 indicates the boundary of each row of data 300 as represented within pairs 400. A last element of RowIndex 410 indicates the number of non-zero values in the represented data.

For example, RowIndex 410 indicates that the boundaries are located at the first pair (i.e., at index 0 of pairs 400), the fourth pair (i.e., at index 3 of pairs 400), the fifth pair (i.e., at index 4 of pairs 400), and the eighth pair (i.e., at index 7 of pairs 400). Accordingly, the first row of training data 300 is represented by the first, second and third pairs of pairs 400 (i.e., the pairs at indices 0, 1, 2 of pairs 400), the second row of training data 300 is represented by the fourth pair of pairs 400 (i.e., the pair at index 3), the third row of training data 300 is represented by the fifth, sixth and seventh pairs of pairs 400 (i.e., the pairs at indices 4, 5, 6 of pairs 400), and the fourth row of training data 300 is represented by the eighth and ninth pairs of pairs 400 (i.e., the pairs at indices 7 and 8).

Figure 5:
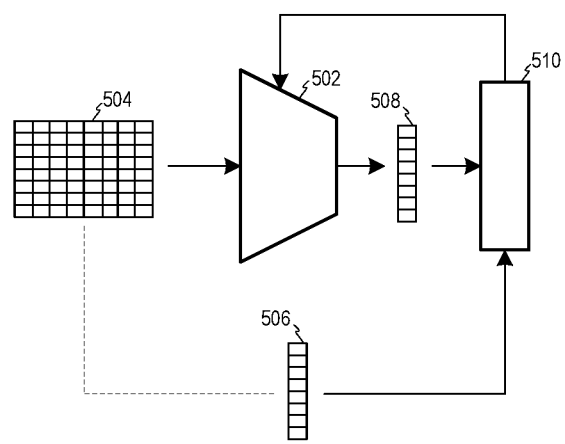
FIG. 5 is a block diagram of iterative model training according to some embodiments.

A model is trained at S210 based on the training data. Training at S210 may comprise execution of a training iteration. With reference to FIG. 5, one iteration according to some embodiments includes inputting training data 504 to model 502, operating model 502 to output resulting predicted values 508 for each row of training data, operating loss layer 510 to evaluate a loss function based on output predicted values 508 and known ground truth data 506, and modifying model 502 based on the evaluation. In the case of a decision tree ensemble model, such modification may include adding a tree to model 502.

After completing the training iteration, model performance is determined at S215. Model performance may be determined based on validation data which is separate from the acquired training data but which includes the same features and associated ground truth data. Determination of model performance may include determination of any one or more metrics of accuracy, precision, etc. that are or become known.

The determination of model performance may differ depending upon the task performed by the subject model. For example, in the case of binary classification, S215 may comprise determination of the Area Under the Receiver Operating Characteristic Curve (ROC AUC). For multiclass classification, S215 may comprise determination of the Balanced Classification Rate (BCR). In addition, for regression tasks, determination of model performance may include determination of the Root Mean Square Error (RMSE).

At S220, it is determined whether performance of the model meets a predetermined stopping criterion. The predetermined stopping criterion may comprise a threshold value of a metric determined at S215, a lack of a decrease in the objective function of the model with respect to the validation data, or one or more other criteria. If the predetermined stopping criterion is not met, it is determined at S225 whether a predefined maximum number of training iterations have been executed. If the predefined maximum number of training iterations have not yet been executed, flow returns to S210 and continues as described above. Training of the model therefore continues until either the stopping criteria is met or execution of the predefined maximum number of training iterations.

The predefined maximum number of training iterations may be a value intended to facilitate accurate determination of feature importance values from the thusly-trained model. The present inventors have discovered that this value may be significantly lower than a number of iterations which would be required to generate a model which exhibits suitable predictive performance. According to some embodiments using decision trees and SGTB, the predefined maximum number of training iterations evaluated at S225 is 200.

At S230, it is determined whether the performance of the currently-trained model has degraded significantly from the performance of the first-trained model. Since the present description has thus far included the training of only a first model, flow proceeds to S232.

S232 comprises a determination of whether a maximum number of feature selection iterations has been executed. As will become clear from the following description, a feature selection iteration of process 200 comprises the removal of one or more features and retraining of a model in view of the removed features. Flow proceeds to S250 if the maximum number of feature selection iterations has been reached. S250 will be described below.

Figures 6, 7, 8:
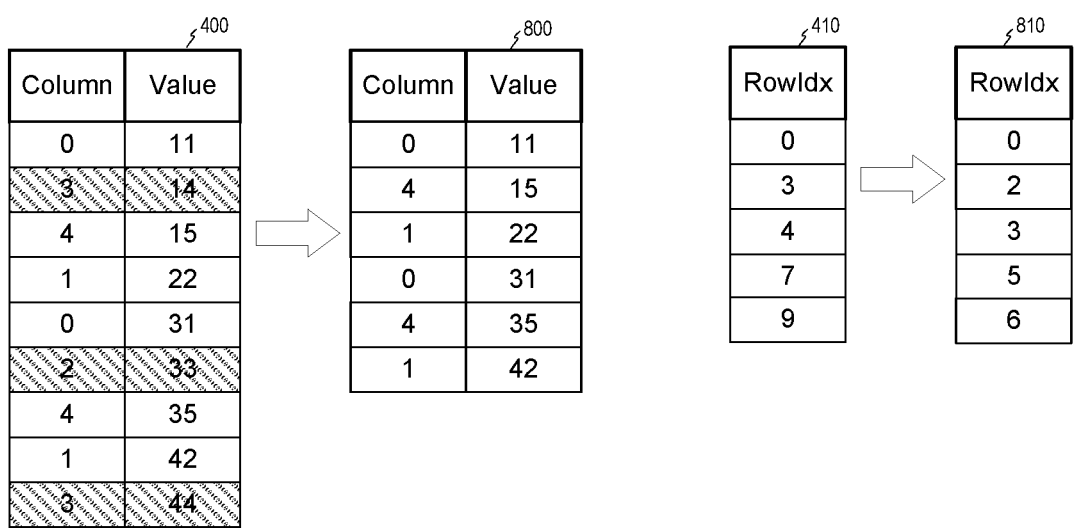
FIG. 6 is a tabular representation of relative feature contribution data according to some embodiments.
FIG. 7 is a tabular representation of aggregated relative feature contribution data according to some embodiments.
FIG. 8 illustrates removal of feature values in CSR format according to some embodiments.

If it is determined at S232 that the maximum number of feature selection iterations has not been reached, the relative importance of each current feature is determined at S235. S235 may comprise determining a SHAP value for each feature of each row of the training data as is known in the art. FIG. 6 illustrates table 600 of SHAP values determined for each value of training data 300. According to some embodiments, and to reduce computation costs, SHAP values are determined for only a subset of rows of the training data (e.g., 2000 rows) and the other rows are ignored during execution of S235.

FIG. 7 further illustrates determining SHAP values for each feature by aggregating all the SHAP values determined for each given feature. The aggregation may comprise a sum, an average, or any other suitable aggregation. S235 may further include sorting the features according to their associated SHAP values.

At S240, it is determined if any features are less important than other features. The determination may be based on the importance values determined for each feature. In one example, the importance values are summed and the features which comprise the top 95% of the total are determined to be important at S240. The remaining features are determined to be less-important. Any other metric or calculation may be used to identify less-important features.

Flow proceeds from S240 to S245 if one or more less-important features are determined. Values associated with the one or more less-important features are removed from the training data at S245. For purposes of the present example, it will be assumed that Feature2 and Feature3 of training data 300 are determined to be less-important at S240. In some embodiments of S245, the corresponding columns are removed from training data 300 and CSR data such as pairs 400 and index 410 is rebuilt based on the remaining training data.

Alternatively, in some embodiments, the existing CSR structures representing the training data are manipulated in-place at S245 to remove the values of the less-important features. Such manipulation may be more efficient than the rebuilding mentioned above.

FIG. 8 illustrates manipulation of pairs 400 and index 410 to remove the values associated with Feature2 and Feature3 of training data 300. Specifically, the pairs of pairs 400 which include column values of 2 or 3 are removed and the remaining pairs of structure 400 are shifted upward to fill the now-empty rows, resulting in pairs 800. The values of RowIndex 410 are also modified to RowIndex 810 reflect this shift. Advantageously, manipulation of the values of RowIndex 410 only requires knowledge of which rows of pairs 400 were removed, rather than knowledge of the original or revised training data.

FIGS. 9 through 12 illustrate population of CSR data structures and removal of values therefrom according to some embodiments.

FIG. 9 is a tabular representation of sparse training data according to some embodiments. Tabular data 900 of FIG. 9 is represented in CSR format by indexed values 1000 and RowIndex 1010 of FIG. 10. Indexed values 1000 represents a flattened list of (column index, value) pairs, while RowIndex 1010 is a list of integer values representing the indexed values 1000 which represent the start of a new row of table 900.

FIG. 11 illustrates table 1100 according to some embodiments. In addition to the above-described column RowIndex 1010, table 1100 stores in bitwise fashion an indicator of the presence (or absence) of non-null values in a given row for each column. In one example in which the bitmask value is stored using 8 bits, Column 0 of table 900 is represented by a 00000001 bitmask, Column 1 of table 900 is represented by a 00000010 bitmask, Column 2 is represented by a 00000100 bitmask, Column 3 is represented by a 00001000 bitmask, etc. Additional columns of table 1100 are used to store bitmask values for column indices greater than 8.

The bitmask used for each row of table 1100 is the OR'd combination of the bitmask values for each column of the row which includes a non-null value. In the first row of table 900, since columns 0, 2 and 3 have non-null values, the bitmask stored in the bitmask column of table 1100 is 00000001 OR 00000100 OR 00001000→00001101. This bitwise indication of non-null values per column index can be leveraged to accelerate column removal from CSR-formatted data, particularly if the data is highly sparse. In particular, the bitwise indication of non-null values per column index enables optimal identification of a row which only contains non-null values within the columns to remove and performing a batch copy of the indexed values, as opposed to iterating over all entries and checking whether their respective index matches the index of column to remove. This optimization is very efficient for sparse data with high dimensionality (i.e., many columns) which can be quite common in machine learning scenarios.

It will be assumed that it is determined at S240 to remove column 2 and 3 from table 900. According to some embodiments, S245 then proceeds by combining the bitmask values of the columns to be removed (i.e., 0000100 OR 0001000→0001100). Then, starting at row index 0 of table 1100, it is determined whether the combined bitmask AND the bitmask of the current row=0. If so, all indexed values related to the current row are batch copied to an outgoing indexed values table (rather than copying entries individually based on a check of with an entry's column index matches a column to be removed), and the row index is incremented by the indexed value entry size related to the current row (i.e., the difference between subsequent row indices). If the combined bitmask AND the bitmask of the current row≠0, copy to the outgoing indexed values table only those entries whose index is not 2 or 3 (i.e., (2,5), (3,1), (3,3). The above process is repeated for the remaining row indices of table 1100. The batch copying of values may dramatically accelerate modification of CSR-formatted data in which the columns to be removed include a substantial percentage of null values.

FIG. 12 illustrates removal of indexed values from table 1000 in CSR format according to some embodiments. The bitmask column of table 1100 is unchanged, and the columns are not re-indexed after removal of a column. Advantageously, the required bitwise operations (OR and AND) execute very quickly.

Flow returns to S210 to train a new model using the reduced-feature set training data. Flow continues to cycle from S210 to S245 to remove features and train new models until it is determined at S230 that the performance of a newly-trained model has degraded unsuitably from performance of the first-trained model. Flow then proceeds to S260 to add the last-removed training features back to the set of training data (e.g., by reversing the last-performed execution of S245. The last-trained model (which was trained based on the now-current set of features of the training data) is determined as the final model at S265.

Alternatively, during an iteration of S240, it may be determined that the current training data includes no less-important features. Using the example described above, it may be determined at S240 that all of the existing features contribute at least 5% to the predictive output of the current model. In such a case, the final model is determined at S250 to be the current (i.e., the last-trained) model.

At S255, the final model is trained based on the current training data including the current features. Training may continue at S255 until a satisfactory performance metric is achieved or until a maximum number of iterations (e.g., 1000) have been executed. In a case that prior training of the now-final model ceased based on stopping criteria at S220, then no further training might be needed at S255.

Figure 13:
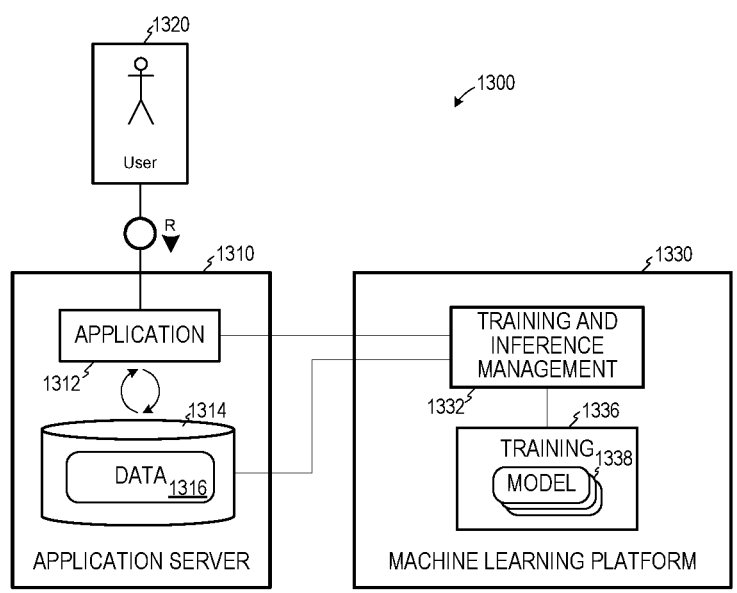
FIG. 13 illustrates a system to provide model training to applications according to some embodiments.

FIG. 13 illustrates system 1300 to provide model training to applications according to some embodiments. Application server 1310 may comprise an on-premise or cloud-based server providing an execution platform and services to applications such as application 1312. Application 1312 may comprise program code executable by a processing unit to provide functions to users such as user 1320 based on logic and on data 1316 stored in data store 1314. Data 1316 may be column-based, row-based, object data or any other type of data that is or becomes known. Data store 1314 may comprise any suitable storage system such as a database system, which may be partially or fully remote from application server 1310, and may be distributed as is known in the art.

According to some embodiments, user 1320 may interact with application 1312 (e.g., via a Web browser executing a client application associated with application 1312) to request a predictive model based on a set of training data. In response, application 1312 may call training and inference management component 1332 of machine learning platform 1330 to request training of a corresponding model according to some embodiments.

Based on the request, training and inference management component 1332 may receive training data from data 1316 and instruct training component 1336 to train a model 1338 based on the training data as described herein. Application 1312 may then use the trained model to generate predictions based on input data selected by user 1320.

In some embodiments, application 1312 and training and inference management component 1332 may comprise a single system, and/or application server 1310 and machine learning platform 1330 may comprise a single system. In some embodiments, machine learning platform 1330 supports model training and inference for applications other than application 1312 and/or application servers other than application server 1310.

Figure 14:
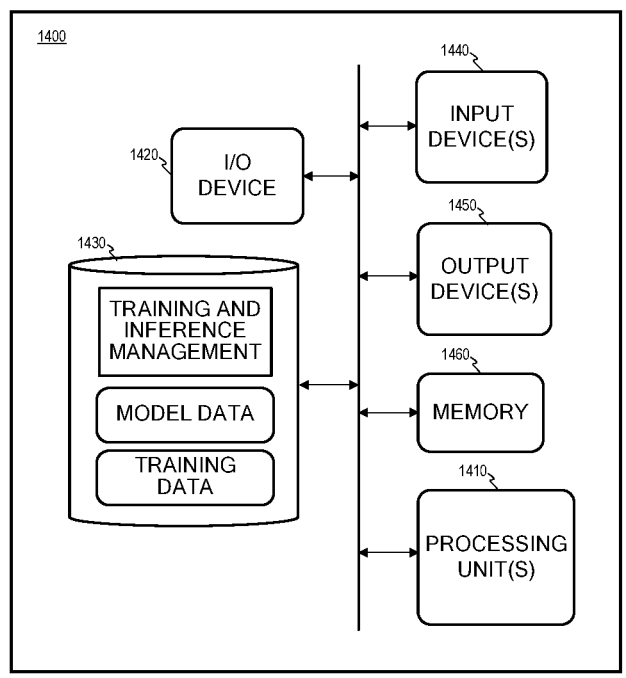
FIG. 14 is a block diagram of a hardware system for providing model training according to some embodiments.

FIG. 14 is a block diagram of a hardware system providing supplier recommendations according to some embodiments. Hardware system 1400 may comprise a general-purpose computing apparatus and may execute program code to perform any of the functions described herein. Hardware system 1400 may be implemented by a distributed cloud-based server and may comprise an implementation of machine learning platform 1330 in some embodiments. Hardware system 1400 may include other unshown elements according to some embodiments.

Hardware system 1400 includes processing unit(s) 1410 operatively coupled to I/O device 1420, data storage device 1430, one or more input devices 1440, one or more output devices 1450 and memory 1460. I/O device 1420 may facilitate communication with external devices, such as an external network, the cloud, or a data storage device. Input device(s) 1440 may comprise, for example, a keyboard, a keypad, a mouse or other pointing device, a microphone, knob or a switch, an infra-red (IR) port, a docking station, and/or a touch screen. Input device(s) 1440 may be used, for example, to enter information into hardware system 1400. Output device(s) 1450 may comprise, for example, a display (e.g., a display screen) a speaker, and/or a printer.

Data storage device 1430 may comprise any appropriate persistent storage device, including combinations of magnetic storage devices (e.g., magnetic tape, hard disk drives and flash memory), optical storage devices, Read Only Memory (ROM) devices, and RAM devices, while memory 1460 may comprise a RAM device.

Data storage device 1430 stores program code executed by processing unit(s) 1410 to cause system 1400 to implement any of the components and execute any one or more of the processes described herein. Embodiments are not limited to execution of these processes by a single computing device. Data storage device 1430 may also store data and other program code for providing additional functionality and/or which are necessary for operation of hardware system 1400, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
   a memory storing processor-executable program code; and
   a processing unit to execute the processor-executable program code to cause the system to:
   determine a data structure representing a plurality of rows, the data structure associating each nonzero value of each of the plurality of rows with an index of one of a first plurality of features represented by the nonzero value, and including a row index indicating locations of nonzero values of each of the plurality of rows within the data structure;
   partially train a first machine-learning model based on the data structure;
   determine one of the first plurality of features to remove from the data structure based on the partially-trained first machine-learning model;
   in response to the determination of the one of the first plurality of features to remove from the data structure, modify the data structure by removal of each nonzero value associated with an index of the one of the first plurality of features from the data structure and modify the row index to indicate new locations of nonzero values of each of the plurality of rows within the data structure;
   partially train a second machine-learning model based on the modified data structure;
   determine that a performance of the partially-trained second machine-learning model is less than a threshold; and
   in response to the determination, train the partially-trained first machine-learning model based on the data structure.

2. The system according to claim 1, wherein partial training of the first machine-learning model comprising executing a predefined number of training iterations, and
   wherein training of the partially-trained first machine-learning model comprises determining that the trained first machine-learning model meets a stopping criterion.

3. The system according to claim 2, wherein determination of the one of the first plurality of features to remove from the data structure based on the partially-trained first machine-learning model comprises:

determination of importance values associated with each of the first plurality of features based on a subset of the data structure and on the partially-trained first machine-learning model.

4. The system according to claim 3, wherein the data structure comprises a first array and a second array, wherein each row of the first array includes a nonzero value of one of the plurality of rows and an index of one of the first plurality of features represented by the nonzero value,
wherein each row of the second array includes a row index representing a starting location in the first array of the nonzero values of a corresponding one of the plurality of rows, and
wherein modification of the data structure comprises:
removal of each row of the first array including the index of the one of the first plurality of features;
after removal of each row of the first array including the index of the one of the first plurality of features, shifting of the rows of the first array to fill the removed rows; and
modification of the row index to indicate new starting locations in the first array of the nonzero values of corresponding ones of the plurality of rows.

5. The system according to claim 2, wherein the first machine-learning model and the second machine-learning model comprise decision tree models, and wherein the training iterations comprise boosting iterations.

6. The system according to claim 1, wherein determination of the one of the first plurality of features to remove from the data structure based on the partially-trained first machine-learning model comprises:
determination of importance values associated with each of the first plurality of features based on a subset of the data structure and on the partially-trained first machine-learning model.

7. The system according to claim 1, wherein the data structure comprises a first array and a second array, wherein each row of the first array includes a nonzero value of one of the plurality of rows and an index of one of the first plurality of features represented by the nonzero value,
wherein each row of the second array includes a row index representing a starting location in the first array of the nonzero values of a corresponding one of the plurality of rows, and
wherein modification of the data structure comprises:
removal of each row of the first array including the index of the one of the first plurality of features;
after removal of each row of the first array including the index of the one of the first plurality of features, shifting of the rows of the first array to fill the removed rows; and
modification of the row index to indicate new starting locations in the first array of the nonzero values of corresponding ones of the plurality of rows.

8. A method comprising:
determining a data structure representing a plurality of rows, the data structure associating each nonzero value of each of the plurality of rows with an index of one of a first plurality of features represented by the nonzero value, and including a row index indicating locations of nonzero values of each of the plurality of rows within the data structure;
partially training a first machine-learning model based on the data structure;
determining one of the first plurality of features to remove from the data structure based on the partially-trained first machine-learning model;
in response to the determination of the one of the first plurality of features to remove from the data structure, modify the data structure by removal of each nonzero value associated with an index of the one of the first plurality of features from the data structure and modify the row index to indicate new locations of nonzero values of each of the plurality of rows within the data structure;
partially training a second machine-learning model based on the modified data structure;
determining that a performance of the partially-trained second machine-learning model is less than a threshold; and
in response to the determination, train the partially-trained first machine-learning model based on the data structure.

9. The method according to claim 8, wherein partial training of the first machine-learning model comprising executing a predefined number of training iterations, and
wherein training of the partially-trained first machine-learning model comprises determining that the trained first machine-learning model meets a stopping criterion.

10. The method according to claim 9, wherein determining the one of the first plurality of features to remove from the data structure based on the partially-trained first machine-learning model comprises:
determining importance values associated with each of the first plurality of features based on a subset of the data structure and on the partially-trained first machine-learning model.

11. The method according to claim 10, wherein the data structure comprises a first array and a second array, wherein each row of the first array includes a nonzero value of one of the plurality of rows and an index of one of the first plurality of features represented by the nonzero value,
wherein each row of the second array includes a row index representing a starting location in the first array of the nonzero values of a corresponding one of the plurality of rows, and
wherein modifying the data structure comprises:
removing each row of the first array including the index of the one of the first plurality of features;
after removing each row of the first array including the index of the one of the first plurality of features, shifting of rows of the first array to fill the removed rows; and
modifying the row index to indicate new starting locations in the first array of the nonzero values of corresponding ones of the plurality of rows.

12. The method according to claim 9, wherein the first machine-learning model and the second machine-learning model comprise decision tree models, and wherein the training iterations comprise boosting iterations.

13. The method according to claim 8, wherein determining the one of the first plurality of features to remove from the data structure based on the partially-trained first machine-learning model comprises:
determining importance values associated with each of the first plurality of features based on a subset of the data structure and on the partially-trained first machine-learning model.

14. The method according to claim 8, wherein the data structure comprises a first array and a second array, wherein each row of the first array includes a nonzero value of one of the plurality of rows and an index of one of the first plurality of features represented by the nonzero value, wherein each row of the second array includes a row index representing a starting location in the first array of the nonzero values of a corresponding one of the plurality of rows, and wherein modifying the data structure comprises:

removing each row of the first array including the index of the one of the first plurality of features;

after removing each row of the first array including the index of the one of the first plurality of features, shifting the rows of the first array to fill the removed rows; and modifying the row index to indicate new starting locations in the first array of the nonzero values of corresponding ones of the plurality of rows.

15. A non-transitory medium storing processor-executable program code executable by a processing unit of a computing system to cause the computing system to:

determine a data structure representing a plurality of rows, the data structure associating each nonzero value of each of the plurality of rows with an index of one of a first plurality of features represented by the nonzero value, and including a row index indicating locations of nonzero values of each of the plurality of rows within the data structure;

partially train a first machine-learning model based on the data structure;

determine one of the first plurality of features to remove from the data structure based on the partially-trained first machine-learning model;

in response to the determination of the one of the first plurality of features to remove from the data structure, modify the data structure by removal of each nonzero value associated with an index of the one of the first plurality of features from the data structure and modify the row index to indicate new locations of nonzero values of each of the plurality of rows within the data structure;

partially train a second machine-learning model based on the modified data structure;

determine that a performance of the partially-trained second machine-learning model is less than a threshold; and in response to the determination, train the partially-trained first machine-learning model based on the data structure.

16. The non-transitory medium according to claim 15, wherein partial training of the first machine-learning model comprising executing a predefined number of training iterations, and wherein training of the partially-trained first machine-learning model comprises determining that the trained first machine-learning model meets a stopping criterion.

17. The non-transitory medium according to claim 16, wherein determination of the one of the first plurality of features to remove from the data structure based on the partially-trained first machine-learning model comprises:

determination of importance values associated with each of the first plurality of features based on a subset of the data structure and on the partially-trained first machine-learning model.

18. The non-transitory medium according to claim 17, wherein the data structure comprises a first array and a second array, wherein each row of the first array includes a nonzero value of one of the plurality of rows and an index of one of the first plurality of features represented by the nonzero value, wherein each row of the second array includes a row index representing a starting location in the first array of the nonzero values of a corresponding one of the plurality of rows, and wherein modification of the data structure comprises:

removal of each row of the first array including the index of the one of the first plurality of features;

after removal of each row of the first array including the index of the one of the first plurality of features, shifting of the rows of the first array to fill the removed rows; and modification of the row index to indicate new starting locations in the first array of the nonzero values of corresponding ones of the plurality of rows.

19. The non-transitory medium according to claim 16, wherein the first machine-learning model and the second machine-learning model comprise decision tree models, and wherein the training iterations comprise boosting iterations.

20. The non-transitory medium according to claim 15, wherein the data structure comprises a first array and a second array, wherein each row of the first array includes a nonzero value of one of the plurality of rows and an index of one of the first plurality of features represented by the nonzero value, wherein each row of the second array includes a row index representing a starting location in the first array of the nonzero values of a corresponding one of the plurality of rows, and wherein modification of the data structure comprises:

removal of each row of the first array including the index of the one of the first plurality of features;

after removal of each row of the first array including the index of the one of the first plurality of features, shifting of the rows of the first array to fill the removed rows; and modification of the row index to indicate new starting locations in the first array of the nonzero values of corresponding ones of the plurality of rows.

* * * * *